March 26, 1963   P. MALLERY ETAL   3,083,328
CONTROL CIRCUIT
Filed Dec. 10, 1959

INVENTORS: P. MALLERY
E. G. RUPPRECHT
BY Joseph C. Redmond Jr.
ATTORNEY

United States Patent Office 3,083,328
Patented Mar. 26, 1963

3,083,328
CONTROL CIRCUIT
Paul Mallery, Murray Hill, N.J., and Emil George Rupprecht, Greentown, Ind., assignors to Bell Telephone Laboratories, Incorporated, New York, N.Y., a corporation of New York
Filed Dec. 10, 1959, Ser. No. 858,784
6 Claims. (Cl. 321—16)

This invention relates to electronic control circuits and more particularly to an electronic control circuit employed in conjunction with a commutator type motor for starting and speed control purposes thereof.

Commutator motors of either the A.C. or D.C. type are widely used in fractional horsepower applications because of a wide speed range and a superior starting characteristic as compared to other types of motors. Speed control of such a motor, however, is erratic, particularly at low speeds, where the rotor lacks sufficient momentum to offset the variable frictional and magnetic forces encountered when running and in changing from a static condition to a sliding or rotating condition when starting. One technique presently known for improving speed control of a commutator motor is to start the motor on half wave rectification and to convert to full wave rectification as speed increases. In the case of certain equipment being driven by the motor, it is desirable that the transition from half wave to full wave rectification be accomplished smoothly and at all times the motor be capable of accurate speed control. In some cases, it is also desirable that the rate of speed change of the motor be limited to prevent injury to the equipment being driven by the motor.

An object of the present invention is an improved motor control circuit.

Another object of the invention is an electronic control circuit adapted for smooth and continuous speed control of commutator type motors.

Still another object is a motor control circuit which accurately controls the speed of a commutator type motor and limits the rate of speed change of the motor from starting to full speed.

A specific object is an electronic control circuit for speed control of a commutator type motor, the control elements operating at a relatively low power level as compared to the motor power level.

A feature of the present invention is means for controlling the pulse width and amplitude of a rectifying means connected across a supply of alternating current and energizing a commutator type motor.

Another feature of the invention is rectifying means for supplying as an output a series of pulses and electronic means for controlling the rate at which the pulse width and amplitude change with respect to time.

Still another feature is rectifying means for supplying a commutator type motor with a series of pulses, the cutoff point and output current of the rectifying means being controlled by electronic means operated at a relatively low power level as compared to the power level of the motor.

A specific feature of the invention is a rectifying means, a source of D.C. potential, a ganged potentiometer and means for connecting the potentiometer and the source of D.C. potential to said rectifying means to control the cutoff point and output current of the rectifying means.

Another specific feature is a transistorized full wave rectifier connected across a supply of alternating current for providing as an output a series of pulses, the operating point and base current of the transistor being controlled by electronic means which includes means for limiting the rate of change of the width and amplitude of the output pulses.

In an illustrative embodiment, the control circuit comprises two transistors as the rectifying elements of a conventional full wave rectifier. The base electrodes of the transistors are connected together and to a transistor network including a potentiometer and a source of direct current. The network is adapted to control the rectifier cutoff point and output current supplied to a commutator type motor in accordance with the setting of the potentiometer, the motor speed thereby being smoothly and continuously controlled from starting to full speed. The network also includes means which limits the rate of speed change of the motor with respect to time.

These and other objects and features will be more fully apprehended from the following detailed specification taken in conjunction with the appended drawing in which.

Figure 1:
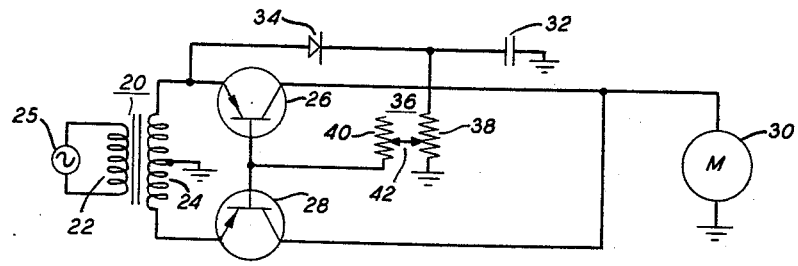
FIG. 1 is an electrical schematic of one embodiment of the present invention.

One embodiment of the present invention, as shown in FIG. 1, comprises a conventional transformer 20 including a primary winding 22 and a secondary winding 24. The primary winding is connected to a suitable source of alternating current 25. The secondary winding is grounded at the midpoint thereof and connected across a conventional full wave rectifier, the output of which is supplied to an electric motor 30. The rectifier includes transistors 26 and 28 which have common base and collector connections. It is to be understood, of course, that the transistors may be one of any of the several types of transistors that are commercially available for rectifier purposes. As shown here, the transistors are of the NPN type, but the circuit may be readily modified to employ PNP type transistors.

For biasing purposes a capacitor 32 is connected between ground and one side of the secondary winding through a blocking diode 34. Completing the circuit of the present invention is a two-stage ganged potentiometer 36 including a first resistor 38, a second resistor 40 and a movable arm 42. The first resistor is connected between ground and the high voltage side of the capacitor 32. The resistor 38 controls the voltage applied to the transistor base connection through the resistor 40. The second resistor 40 connects the common base lead of the transistors to ground and functions as a rheostat in series with the rectifier as will be explained hereinafter. The movable arm 42 selects the resistance settings on both resistors at the same time.

When an A.C. voltage of suitable magnitude is applied across the input winding 22, the transistors act as rectifying diodes in a full wave rectifier. For reasons well known, the transistors will alternately conduct as the polarity of the transformer output leads changes, the output current of the rectifier supplied to the motor being a series of half wave pulses.

Each time the transistor 26 conducts the capacitor 32 is charged through the diode 34, the combination of the capacitor and the diode acting as a battery of fixed potential for biasing the rectifier. A portion of this fixed potential is selected by setting movable arm 42, resistor 38 acting as a voltage divider. The voltage set by movable arm 42 is applied to the rectifier through the transistor common base connection and back biases the emitters thereof to prevent conductance until the transformer voltage exceeds the voltage set by the resistor 38. As a consequence, the setting of the potentiometer with respect to the resistor 38 controls the cutoff point of the rectifier or the width of the output pulses.

The setting of the potentiometer also controls the amplitude of the output pulses. The resistor 40 included in the potentiometer controls the magnitude of the transistor base current flowing to ground. As is well known, the transistor base current is related to the transistor collector or output current by the factor $\beta$ which is nominally constant but depends upon the characteristics of the transistor. Thus, controlling the magnitude of the base current by the value of the resistor 40 also controls the magnitude or amplitude of the output current. The potentiometer 36 is ganged so that the movable arm 42 thereof selects both the amplitude and pulse width of the output current at any one setting.

Figure 2:
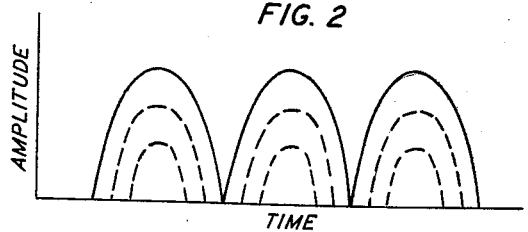
FIG. 2 is a graph of output pulses with respect to time for the embodiment disclosed in FIG. 1.

The output current of the present invention is shown in FIG. 2, the solid line of the curve indicating the full wave rectifier output without control and the dotted lines indicating two of the many possible controlled outputs obtainable by the present invention. It is believed evident from FIG. 2, that the controlled output current of the present invention permits smooth and continuous regulation of the motor speed from starting to full speed in accordance with the single setting of the potentiometer 36. The large number of possible outputs by the present invention also enables the speed of a motor to be accurately controlled from starting to full speed. Moreover, the motor speed is controlled by changing the base current of the transistor which is considerably less in magnitude than the output current supplied to the motor.

Figure 3:
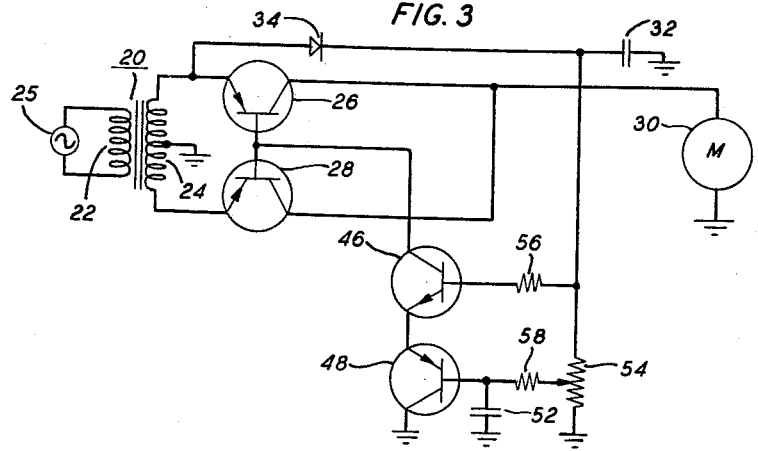
FIG. 3 is an electrical circuit schematic of another embodiment of the present invention which includes means for limiting the rate of change of the output current with respect to time.

In many cases it is desirable to limit the rate of speed change of a motor for efficient operation of equipment being driven by the motor or the prevention of possible damage to such equipment by sudden speed changes thereto. For example, in coil winding machines, the sudden acceleration of the motor driving the machine could snap the wire being wound on the coil thereby requiring shutdown of the machine and loss of efficiency in effecting repairs thereto. In FIG. 3, the present invention has been modified to include means which limits the rate of speed change of a motor energized by the circuit of the present invention. Insofar as practicable, like members identifiable in FIGS. 1 and 3 have been given the same reference character.

The circuit shown in FIG. 3 is similar to that shown in FIG. 1 except that the potentiometer 36 of the latter figure has been replaced by electronic means which controls the amplitude and width of the output pulses as well as limiting the rate of change of these output pulse characteristics. The controlling and limiting means of FIG. 3 comprises transistors 46 and 48 of PNP and NPN types, respectively, the transistors being connected emitter-to-emitter, a time constant circuit including a resistor 58 and a capacitor 52, a potentiometer 54, and a dropping resistor 56. The transistors 46 and 48 are connected between the common base connection of the transistors 26 and 28 and ground. Both transistors 46 and 48 are biased from the capacitor 32, which is connected to ground through the potentiometer 54. The transistor 46 is biased by connecting the base lead thereof through the resistor 56 to the capacitor 32. The transistor 48 is biased by connecting the base lead thereof through the resistor 58 and the potentiometer 54 to the capacitor. The time constant circuit is connected between the base electrode of the transistor 48 and ground. As will be mentioned hereinafter, the time constant circuit limits the rate of change of the output pulses.

When a voltage is applied to the input winding 22 of FIG. 3, the transistors 26 and 28, the capacitor 32 and the diode 34 function as they do in the circuit of FIG. 1. The potentiometer 54 sets the voltage applied to the base of the transistor 48 and across the time constant circuit. When the potentiometer setting is changed, the bias voltage on the transistor base changes at a rate determined by the time constant circuit. The transistor 48 is connected in a common collector type circuit and, as is well known, the emitter voltage in such a circuit is substantially the same as the voltage applied to the base of the transistor. The emitter voltage of the transistor 48 is connected through the transistor 46 to the common base connection of the transistors 26 and 28 to control the cutoff point thereof or the width of the output pulses. Thus, the transistor 48 and the potentiometer perform the same function as that of the resistor 38 included in the potentiometer 36 shown in FIG. 1.

The transistor 46 is biased at both the base and emitter electrodes thereof. The base electrode is connected through the base resistor 56 to the fixed voltage appearing across the capacitor 32. The emitter electrode is connected to the voltage appearing at the emitter of the transistor 48, the emitter voltage being variable in accordance with the setting of the potentiometer. The base current of the transistor 46 is equal to the voltage across the resistor 56 divided by the magnitude of the resistor, the voltage across the resistor being essentially equal to the difference between the voltage at the capacitor and the voltage at the emitter junction. Since the capacitor voltage is fixed, and the emitter voltage varies, then the base current is essentially proportional to the emitter voltage. By controlling the current flowing into the base of the transistor 46, the output current (collector currents of the rectifying transistors 46 and 48) is controlled. The output current is related to the base current of the rectifying transistors by the $\beta$ characteristic thereof. In turn the base current of the rectifying transistors is the same as the collector current of the transistor 46, the base and collector currents thereof being related to each other by the $\beta$ characteristic of the transistor 46. When the base current of the transistor 46 is changed, the collector current thereof changes which in turn changes the base and output currents of the rectifying transistors. As a consequence, the transistor 46 has the same purpose as that of the resistor 40 included in the embodiment shown in FIG. 1.

Thus, the output current of the embodiment shown in FIG. 3 is controlled by the movement of the potentiometer 54. Changing the potentiometer varies both the bias voltage applied to the common base connection of the rectifier as well as the base current flow therefrom. The rate of change of the output current is controlled by the time constant circuit which regulates the potentiometer voltage such that the equipment being driven by the motor 30 is not damaged from sudden or unexpected increases in speed. Thus, it is believed evident that the circuit of the present invention provides a plurality of outputs to permit continuous and accurate speed control of a commutator motor from starting to full speed without the difficulty of erratic speed control at low speeds due to variable frictional and magnetic forces encountered by the rotor in changing from a static to a sliding or rotation condition.

It is to be understood that the present embodiments are only illustrative of the principles of the present invention. Numerous other electronic embodiments of the present invention may be made by those skilled in the art without departing from the spirit and scope of the present invention.

What is claimed is:

1. A control circuit comprising at least one rectifying transistor having a base electrode, an emitter electrode, and a collector electrode for converting an alternating-current wave to a series of unipolar symmetrical pulses, a source of direct current for biasing said transistor, and control means connected to said base electrode and said source of direct current for simultaneously regulating the width and amplitude of said symmetrical pulses, said control means including at least first and second control transistors, said control transistors being connected to have principal conduction paths both in series with each other and in series with said base electrode, and means for selectively biasing said control transistors.

2. The control circuit as defined in claim 1 wherein said control means includes a time constant circuit for limiting the rate of change of the width and amplitude of said symmetrical pulses.

3. A control circuit comprising means including a pair of rectifying transistors each having a base electrode, an emitter electrode, and a collector electrode for full wave rectification of an alternating-current wave and providing as an output a series of unipolar symmetrical pulses, a control network coupled to said base electrodes, said network including a potentiometer and first and second control transistors, said control transistors being connected to have their principal conduction paths both in series with each other and in series with said base electrodes, and means including said potentiometer for biasing said control transistors, said first control transistor being disposed so as to regulate the cutoff point of said pair of rectifying transistors and said control transistor being disposed so as to regulate the amplitude of said symmetrical pulses, said first and second control transistors and said potentiometer being further disposed such that the regulation of the cutoff point of said pair of rectifying transistors and the amplitude of said symmetrical pulses provided by said control transistors occur simultaneously in accordance with the setting of said potentiometer.

4. A control circuit comprising means including at least two transistors each having a base electrode, an emitter electrode and collector electrode for full wave rectification of an alternating-current wave and producing as an output a series of unipolar symmetrical pulses, a control network connected to said base electrodes for regulating the width and amplitude of said symmetrical pulses, said control network including first and second transistors connected to have their principal conduction paths both in series with each other and in series with said base electrodes, a source of direct current for biasing said first and second transistors, said source including a serially connected potentiometer and time constant circuit coupled to said first transistor, said time constant circuit and said potentiometer respectively being disposed so as to regulate the rate of change and the magnitude of the bias voltage applied to said first control transistor.

5. A control circuit comprising means including at least two transistors for rectifying an alternating-current wave and providing a series of unipolar symmetrical pulses as an output signal, each of said transistors comprising a base and emitter and a collector electrode, control network means coupled to said base electrodes of said transistors for regulating the width and amplitude of said pulses, said control network means including first and second transistors, each of said transistors comprising a base electrode, an emitter electrode, and a collector electrode, means for connecting said emitter electrode of said first transistor to the emitter electrode of said second transistor, means for connecting said collector electrode of said second transistor to the base electrodes of said rectifying transistors, a time constant circuit connected to the base electrode of said first transistor, and a potentiometer connected to said time constant circuit, a source of unidirectional potential for biasing the base electrodes of said first and second transistors with respect to the corresponding emitter electrodes, said time constant circuit and said potentiometer being connected to said source of potential so as to control the rate of change and the magnitude, respectively, of the bias potential applied to said first transistor.

6. A transistor-rectifier circuit for producing a series of symmetrical pulses as an output signal comprising at least one rectifying transistor, said transistor having a base electrode, an emitter electrode and a collector electrode, first and second control transistors, each of said control transistors having a base electrode, an emitter electrode, and collector electrode, said collector electrode of said first control transistor being connected to said base electrode of said rectifying transistor, said emitter electrode of said first control transistor being connected to said emitter electrode of said second control transistor, a source of unidirectional potential for biasing said transistors, said base electrode of said first control transistor being connected to said source, a potentiometer connected to said source for detecting a potential of selectable magnitude, and a time constant circuit coupling said potentiometer to said second control transistor, said time constant circuit comprising both a series resistor connected between said potentiometer and said base electrode of said second control transistor and a shunt capacitor connected between said base and emitter electrodes of said second control transistor.

References Cited in the file of this patent

UNITED STATES PATENTS

| | | |
|---|---|---|
| 2,002,281 | Stansbury | May 21, 1935 |
| 2,020,314 | Howe | Nov. 12, 1935 |
| 2,095,742 | Haller | Oct. 12, 1937 |
| 2,151,560 | Morack | Mar. 21, 1939 |
| 2,236,086 | Conover | Mar. 25, 1941 |
| 2,609,524 | Greene | Sept. 2, 1952 |
| 2,698,416 | Sherr | Dec. 28, 1954 |
| 2,776,382 | Jensen | Jan. 1, 1957 |
| 2,898,476 | Jensen | Aug. 4, 1959 |
| 2,928,036 | Walker | Mar. 8, 1960 |

OTHER REFERENCES

Applied Electronics; 2nd ed., 1955, Gray, Truman S.; Wiley and Sons, Inc.